(12) United States Patent
Barsukov et al.

(10) Patent No.: US 7,443,140 B2
(45) Date of Patent: Oct. 28, 2008

(54) METHOD AND APPARATUS FOR OPERATING A BATTERY TO AVOID DAMAGE AND MAXIMIZE USE OF BATTERY CAPACITY BY TERMINATING BATTERY DISCHARGE

(75) Inventors: Yevgen Barsukov, Richardson, TX (US); Dan Russell Poole, Austin, TX (US); Jinrong Qian, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 435 days.

(21) Appl. No.: 11/329,799

(22) Filed: Jan. 11, 2006

(65) Prior Publication Data
US 2007/0029970 A1 Feb. 8, 2007

Related U.S. Application Data

(60) Provisional application No. 60/704,643, filed on Aug. 2, 2005.

(51) Int. Cl.
*H02J 7/00* (2006.01)
(52) U.S. Cl. .................. 320/136; 320/135; 324/427
(58) Field of Classification Search ................. 320/134, 320/135, 136, 132, 149, 162; 324/427, 428, 324/433
See application file for complete search history.

(56) References Cited

U.S. PATENT DOCUMENTS

| 6,107,779 | A | * | 8/2000 | Hara et al. .................. 320/132 |
| 6,789,026 | B2 | | 9/2004 | Barsoukov et al. |
| 6,832,171 | B2 | | 12/2004 | Barsoukov et al. |
| 6,892,148 | B2 | | 5/2005 | Barsoukov et al. |
| 2006/0055374 | A1 | * | 3/2006 | Fujihara et al. ............. 320/132 |

* cited by examiner

*Primary Examiner*—Adolf Berhane
*Assistant Examiner*—Aaron Piggush
(74) *Attorney, Agent, or Firm*—Wade J. Brady, III; Frederick J. Telecky, Jr.

(57) ABSTRACT

A method for terminating battery discharge to avoid battery damage and maximize battery usage includes the steps of: (a) determining battery capacity; (b) storing a capacity result of the capacity determining; (c) determining battery voltage; (d) during a monitored battery operation, integrating battery current flow over a time interval to determine an integrated charge value at an end-of-interval-time; (e) determining an extant depth of discharge at the end-of-interval-time; (f) if the extant depth of discharge is neither within a first range of a maximum depth of discharge nor the battery voltage is within a second range of a minimum battery voltage, carrying out steps (d) through (f); (h) if the extant depth of discharge is within the first range of the maximum depth of discharge or if the battery voltage is within the second range of the minimum battery voltage, terminating the monitored battery operation.

20 Claims, 4 Drawing Sheets

US 7,443,140 B2

METHOD AND APPARATUS FOR OPERATING A BATTERY TO AVOID DAMAGE AND MAXIMIZE USE OF BATTERY CAPACITY BY TERMINATING BATTERY DISCHARGE

This application claims benefit of prior filed copending Provisional Patent Application Ser. No. 60/704,643, filed Aug. 2, 2005.

BACKGROUND OF THE INVENTION

The present invention generally relates to controlling operation of a battery to assure termination of discharge of the battery before damaging the battery. It is known that discharge of a battery must be effected at or above a particular state of charge to avoid damaging the battery. In the past the state of charge for determining whether to terminate discharge of a battery has been determined based on a fixed voltage. However, battery terminal voltage when a load is applied to the battery is comprised of two elements: (1) a fixed battery voltage value based upon the open circuit voltage characteristic of the battery, and (2) internal impedance of the battery determined by current-resistance (IR) drop within the battery. A fixed battery termination voltage does not reflect changes in terminal voltage caused by a load being coupled with the battery. Further, a fixed battery termination voltage does not reflect changes in internal resistance of the battery that occur as the battery ages.

For purposed of this description, the term "age" is intended to refer to the number of charge/discharge cycles to which a battery has been subjected rather than the chronological amount of time that the battery has existed.

For a new battery the difference in state of charge is small with a charging current present as compared with an open circuit state of charge. However, the difference in states of charge can increase significantly as the battery ages because the internal resistance of the battery increases with age. By way of example and not by way of limitation, internal resistance of a lithium ion battery can increase by five times after 300 charge/discharge cycles.

A detrimental result of failing to account for change in internal IR drop within a battery as the battery ages and relying solely on a fixed termination voltage for the battery is that battery operation may be under-utilized. That is, terminating discharge of the battery at a fixed termination voltage may leave a significant amount of battery capacity unused. Because of the increase in internal battery impedance, up to about 30% of chemical capacity of a battery may be still available for use when discharge of the battery terminated solely based upon a fixed termination voltage.

There is a need for a method and apparatus for controlling discharge of a battery to avoid damage to the battery while maximizing use of battery capacity.

SUMMARY OF THE INVENTION

A method for terminating battery discharge to avoid battery damage and maximize battery usage includes the steps of: (a) determining battery capacity; (b) storing a capacity result of the capacity determining; (c) determining battery voltage; (d) during a monitored battery operation, integrating battery current flow over a time interval to determine an integrated charge value at an end-of-interval-time; (e) determining an extant depth of discharge at the end-of-interval-time; (f) if the extant depth of discharge is neither within a first range of a maximum depth of discharge nor the battery voltage is within a second range of a minimum battery voltage, carrying out steps (d) through (f); (h) if the extant depth of discharge is within the first range of the maximum depth of discharge or if the battery voltage is within the second range of the minimum battery voltage, terminating the monitored battery operation.

An apparatus for controlling operation of a battery to terminate discharge of the battery to avoid damage to the battery and substantially maximize use of chemical capacity of the battery includes: (a) A processing and control unit coupled with the battery. The processing and control unit determines a first depth of discharge of the battery while the battery is in a relaxed state before commencement of a first battery operation. The processing and control unit determines a second depth of discharge of the battery while the battery is in a relaxed state after completion of the first battery operation. (b) A first measuring unit coupled with the battery and with the processing and control unit. The first measuring unit determines current flow from the battery during the first battery operation. (c) A second measuring unit coupled with the battery and with the processing and control unit. The second measuring unit determines a battery voltage across the battery. The processing and control unit employs the first depth of discharge, the second depth of discharge and the current flow for determining maximum chemical capacity of the battery after completion of the first battery operation. During a next battery operation following the first battery operation, the processing and control unit integrates current flow from the battery with respect to time over a time interval to determine an integrated charge value at an end-of-interval-time substantially when the interval ends. The processing and control unit employs the maximum chemical capacity, the integrated charge value and the first depth of discharge to determine an extant depth of discharge at the end-of-interval-time. If the extant depth of discharge is neither within a first predetermined range of a predefined maximum depth of discharge nor the battery voltage is within a second predetermined range of a predefined minimum voltage, the processing and control unit cooperates with the first and second measuring units to determine a subsequent depth of discharge at a subsequent time. If the extant depth of discharge is within a first predetermined range of a predefined maximum depth of discharge or if the battery voltage is within a second predetermined range of a predefined minimum voltage, the next battery operation is terminated.

It is, therefore, an object of the present invention to provide a method and apparatus for controlling discharge of a battery to avoid damage to the battery while maximizing use of battery capacity.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
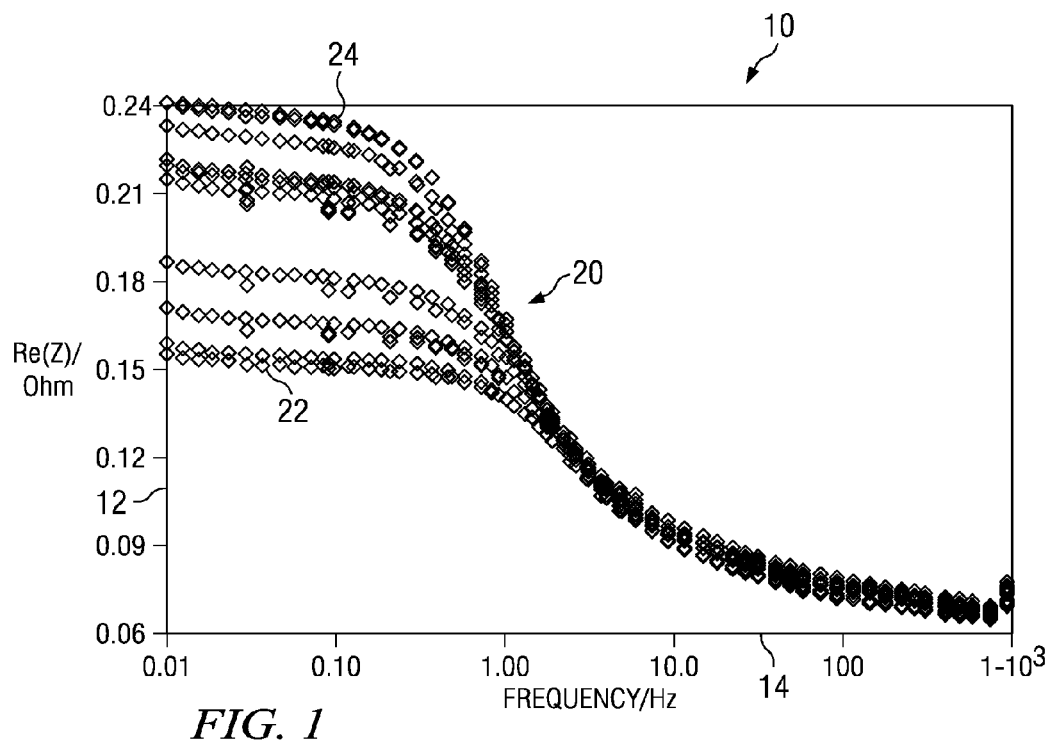
FIG. 1 is a graphic representation of internal battery impedance as a function of frequency as the relationship changes with age of a battery.

FIG. 1 is a graphic representation of internal battery impedance as a function of frequency as the relationship changes with age of a battery. In FIG. 1, a graphic representation 10 indicates data with respect to impedance Z (in Ohms) on a first axis 12 and with respect to frequency (in Hertz, Hz) on a second axis 14. Represented data is arrayed in a plurality of curves 20. Plurality of curves 20 ranges from an early curve 22 representing data from a battery at an early age (i.e., having been subjected to relatively few charge/discharge cycles) to a later curve 24 representing data from the battery at a later age (i.e., having been subjected to a greater number of charge/discharge cycles). One may observe from FIG. 1 that at low frequencies the internal impedance Z of the battery increases as the age of the battery increases. This is a significant result because the battery is commonly employed for providing direct current (DC)—low frequency—power to a supplied device or host device, such as a laptop computer or similar device.

Figure 2:
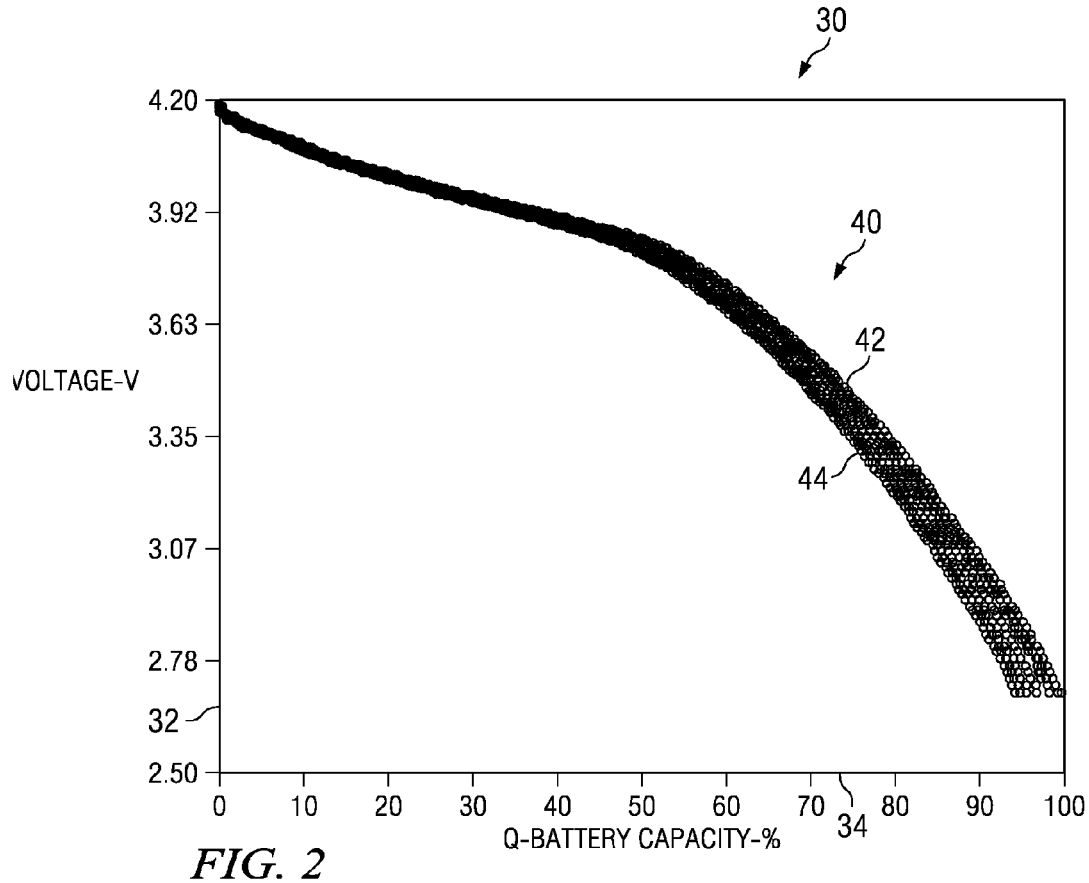
FIG. 2 is a graphic representation of battery terminal voltage as a function of battery capacity as the relationship changes with age of a battery.

FIG. 2 is a graphic representation of battery terminal voltage as a function of battery capacity as the relationship changes with age of a battery. In FIG. 2, a graphic representation 30 indicates data with respect to voltage (in Volts, V) on a first axis 32 and with respect to battery capacity Q (in %) on a second axis 34. Represented data is arrayed in a plurality of curves 40. Plurality of curves 40 ranges from an early curve 42 representing data from a battery at an early age (i.e., having been subjected to relatively few charge/discharge cycles) to a later curve 44 representing data from the battery at a later age (i.e., having been subjected to a greater number of charge/discharge cycles). One may observe from FIG. 2 that battery capacity decreases as the age of the battery increases. It is typical of lithium ion batteries, for example, that capacity losses because of IR drop increases with battery age have a greater impact on total battery capacity than changes in chemical capacity alone caused by battery aging. By way of example and not by way of limitation, capacity of a lithium ion battery at a 10 hour rate of discharge changes about 6% in 100 cycles. However, if the effect of IR drop is removed, it is estimated that capacity of the lithium ion battery changes only 3% during an aging of 100 cycles.

Figure 3:
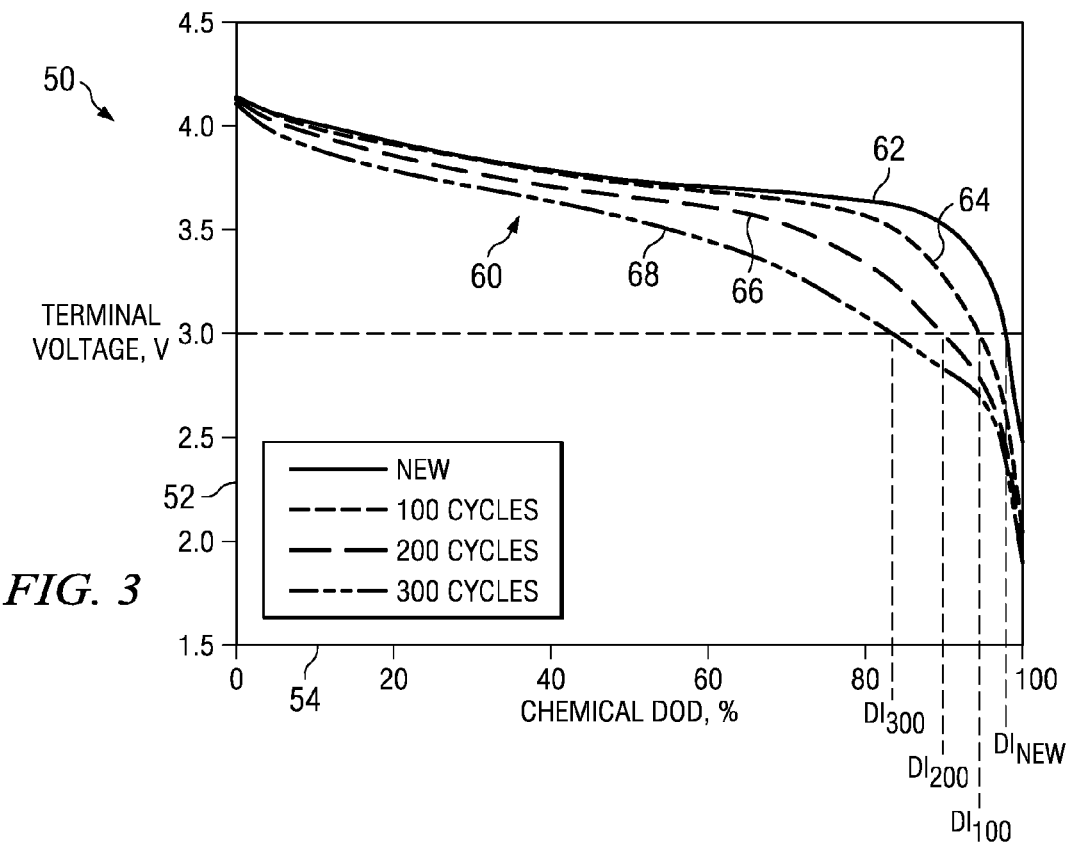
FIG. 3 is a graphic representation of battery terminal voltage as a function of battery depth of discharge for a first rate of discharge as the relationship changes with age of a battery.

FIG. 3 is a graphic representation of battery terminal voltage as a function of battery depth of discharge for a first rate of discharge as the relationship changes with age of a battery. In FIG. 3, a graphic representation 50 indicates data with respect to terminal voltage (in Volts, V) on a first axis 52 and with respect to battery chemical depth of discharge (DOD, in %) on a second axis 54. Represented data is arrayed in a plurality of curves 60. Plurality of curves 60 includes a new battery curve 62 representing data from a new battery (i.e., having been subjected to no charge/discharge cycles), a 100-cycle battery curve 64 representing data from a battery having been subjected to 100 charge/discharge cycles, a 200-cycle battery curve 66 representing data from a battery having been subjected to 200 charge/discharge cycles and a 300-cycle battery curve 68 representing data from a battery having been subjected to 300 charge/discharge cycles. At a representative terminal voltage value of 3 volts, one may observe that new battery curve 62 indicates that a new battery has a DOD of $D1_{NEW}$. At a terminal voltage of 3 volts, 100-cycle battery curve 64 indicates that a battery aged to 100-cycles has a DOD of $D1_{100}$, and $D1_{100} < D1_{NEW}$. At a terminal voltage of 3 volts, 200-cycle battery curve 66 indicates that a battery aged to 200-cycles has a DOD of $D1_{200}$, and $D1_{200} < D1_{100}$. At a terminal voltage of 3 volts, 300-cycle battery curve 68 indicates that a battery aged to 300-cycles has a DOD of $D1_{300}$, and $D1_{300} < D1_{200}$. One may therefore observe from FIG. 3 that battery depth of discharge (DOD) is affected to result in a lesser available percentage of capacity available as the age of the battery increases.

Figure 4:
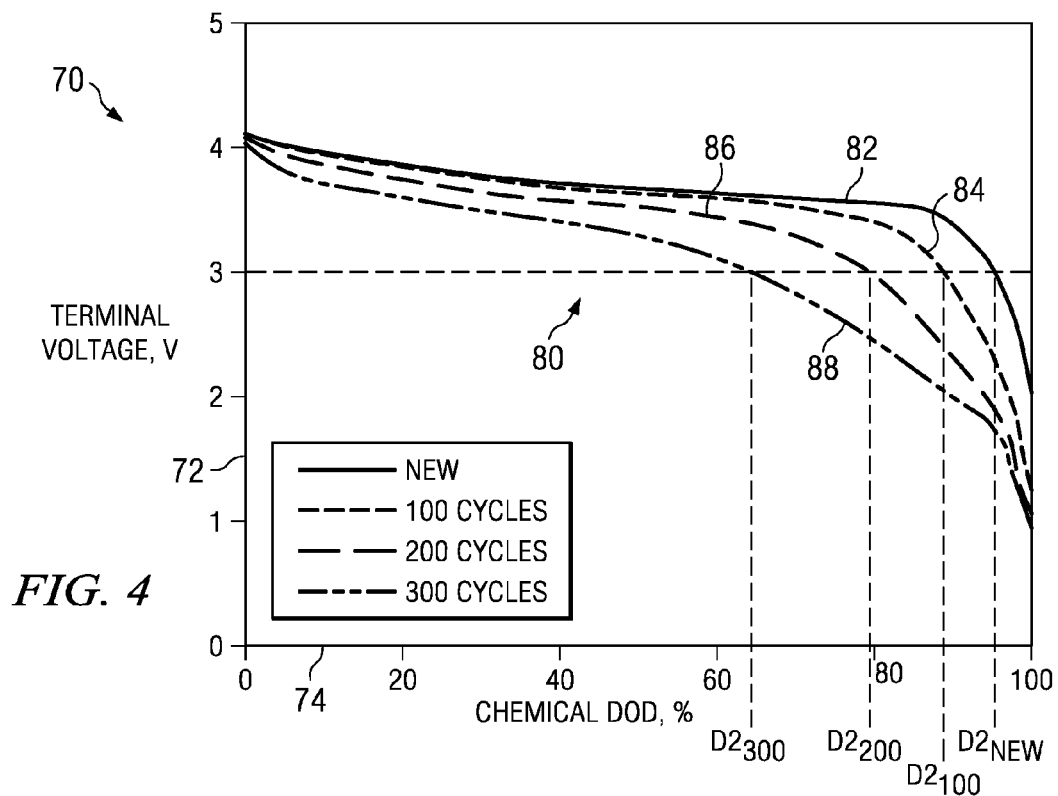
FIG. 4 is a graphic representation of battery terminal voltage as a function of battery depth of discharge for a second rate of discharge higher than the first rate of discharge illustrated in FIG. 3 as the relationship changes with age of a battery.

FIG. 4 is a graphic representation of battery terminal voltage as a function of battery depth of discharge for a second rate of discharge higher than the first rate of discharge illustrated in FIG. 3 as the relationship changes with age of a battery. In FIG. 4, a graphic representation 70 indicates data with respect to terminal voltage (in Volts, V) on a first axis 72 and with respect to battery chemical depth of discharge (DOD, in %) on a second axis 74. Represented data is arrayed in a plurality of curves 80. Plurality of curves 80 includes a new battery curve 82 representing data from a new battery (i.e., having been subjected to no charge/discharge cycles), a 100-cycle battery curve 84 representing data from a battery having been subjected to 100 charge/discharge cycles, a 200-cycle battery curve 86 representing data from a battery having been subjected to 200 charge/discharge cycles and a 300-cycle battery curve 88 representing data from a battery having been subjected to 300 charge/discharge cycles. At a representative terminal voltage value of 3 volts, one may observe that new battery curve 82 indicates that a new battery has a DOD of $D2_{NEW}$. At a terminal voltage of 3 volts, 100-cycle battery curve 84 indicates that a battery aged to 100-cycles has a DOD of $D2_{100}$, and $D2_{100} < D2_{NEW}$. At a terminal voltage of 3 volts, 200-cycle battery curve 86 indicates that a battery aged to 200-cycles has a DOD of $D2_{200}$, and $D2_{200} < D2_{100}$. At a terminal voltage of 3 volts, 300-cycle battery curve 88 indicates that a battery aged to 300-cycles has a DOD of $D2_{300}$, and $D2_{300} < D2_{200}$. One may therefore observe from FIG. 4 that battery depth of discharge (DOD) is affected to result in a lesser available percentage of capacity available as the age of the battery increases.

Comparing FIGS. 3 and 4, one may also observe that, by way of example and not by way of limitation, for a representative terminal voltage of 3 volts, $D2_{NEW} < D1_{NEW}$, $D2_{100} < D1_{100}$, $D2_{200} < D1_{200}$ and $D2_{300} < D1_{300}$. This is so because the rate of discharge associated with FIG. 3 is less than the rate of discharge associated with FIG. 4. A higher rate of discharge (FIG. 4) results in a greater loss of capacity in a battery, as manifested by lesser DODs for each given terminal voltage and similar ages, as indicated by battery discharge data represented in FIGS. 3 and 4.

Figure 5:
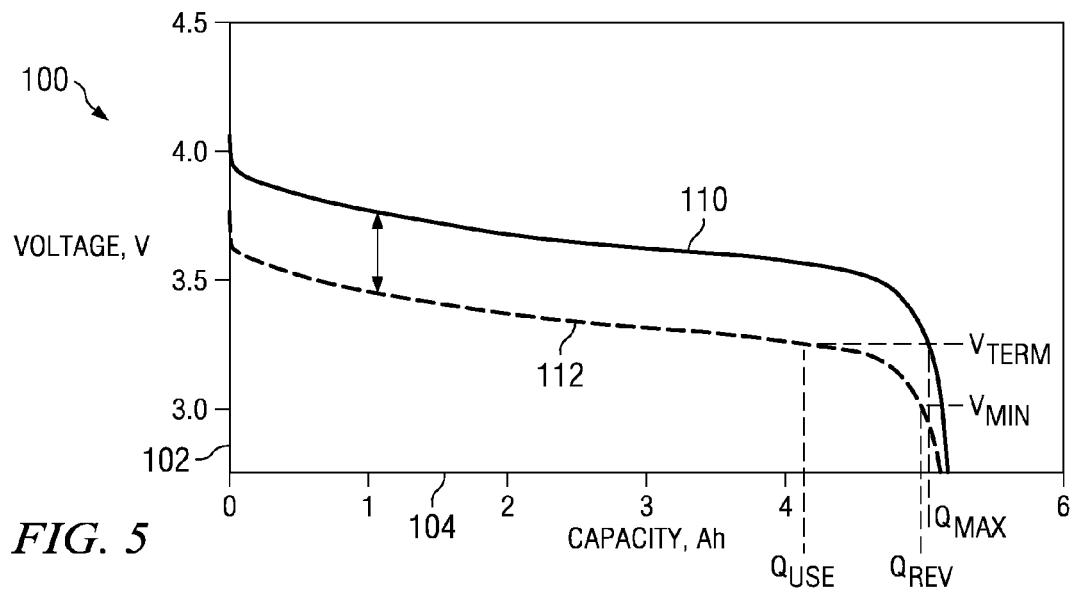
FIG. 5 is a graphic representation of battery terminal voltage as a function of battery capacity illustrating the effect of internal resistance of a battery under load upon use of battery capacity.

FIG. 5 is a graphic representation of battery terminal voltage as a function of battery capacity illustrating the effect of internal resistance of a battery under load upon use of battery capacity. In FIG. 5, a graphic representation 100 indicates data with respect to terminal voltage (in Volts, V) on a first axis 102 and with respect to battery capacity (Q, in Ampere-hours, Ah) on a second axis 104. A curve 110 represents terminal voltage as a function of battery capacity for a battery under an open circuit voltage (OCV) condition. A curve 112 represents terminal voltage as a function of battery voltage for a battery under load (i.e., with a load applied across the battery terminals).

Under an OCV condition (curve 110), no load is present on the battery terminals. As time elapses without effecting any battery operations, capacity is lost and terminal voltage declines. There is a danger of harming a battery if too low a capacity is permitted (that is, if the battery is permitted to fully discharge), and battery manufacturers generally publish or otherwise establish a recommended termination voltage $V_{TERM}$ below which the battery is not to be operated. Capacity existing at termination voltage $V_{TERM}$ is a generally accepted value of maximum capacity $Q_{MAX}$ for the battery. In contrast when there is a load applied across the battery terminals, internal impedance within the battery causes IR (current-resistance) losses so that the battery is discharged more rapidly than in an OCV condition (curve 110). Capacity existing at termination voltage $V_{TERM}$ for a battery under load (curve 112) is a usable capacity $Q_{USE}$ under the loaded conditions experienced by the battery. Usable capacity $Q_{USE}$ is a lesser capacity than maximum capacity $Q_{MAX}$. There is unused capacity $Q_{AVAIL}$ available from the battery at termination voltage $V_{TERM}$ in the amount of:

$$Q_{AVAIL} = Q_{MAX} - Q_{USE} \quad [1]$$

As battery conditions change with age (discussed in connection with FIGS. 1-4) the difference Δ (difference Δ is directly proportional with internal impedance loss within the battery, IR) between curve 110 and curve 112 will widen because the aging of a battery affects internal impedance of a battery more than age affects the OCV performance of a battery. As difference Δ increases, the termination voltage $V_{TERM}$ will be reached at yet a lower capacity than $Q_{USE}$. A result is that greater available capacity $Q_{AVAIL}$ will be lost as the battery ages.

As a practical matter, a host device operates at a minimum voltage $V_{MIN}$ or above. That is, there is a minimum voltage $V_{MIN}$ below which a device will not operate. It is common that minimum $V_{MIN}$ is less than the termination voltage $V_{TERM}$ recommended by battery manufacturers for terminating discharge of a battery.

To manage use of a battery to operate a host device to recognize the effects of aging in a battery, one should operate the battery to continue discharging the battery so long as battery terminal voltage does not go below minimum voltage $V_{MIN}$ of the host device and so long as maximum capacity $Q_{MAX}$ is not exceeded. In this manner, one may safely operate a host device using the battery without risking over-discharging the battery. Using such an approach to battery operation management reduces unused capacity $Q_{AVAIL}$ available from the battery to:

$$Q_{AVAIL} = Q_{MAX} - Q_{REV} \quad [2]$$

Inspection of FIG. 5 reveals that less capacity is left unused and therefore wasted when operation of a battery operated device is managed to recognize the effects of aging in a battery, as described above. A practical advantage of this improved method for operating a battery is increased runtime because the host device may continue to be run after termination voltage $V_{TERM}$ is reached, thereby using the capacity that would have been unused had prior art management techniques been employed for terminating discharge of the battery.

The graphic representations illustrated in FIGS. 1-5 are representations of data. It is important to keep in mind that the data represented may be presented using other formats and methods. By way of example and not by way of limitation data relating to the subjects of FIGS. 1-5 may be kept and addressing different discharge rates, different ages and different terminal voltages. By way of further example and not by way of limitation, such data may be arranged in families of tables or families of charts; the data may be stored and accessed using multi-dimensional matrices or other storage-and-access arrangements.

Figure 6:
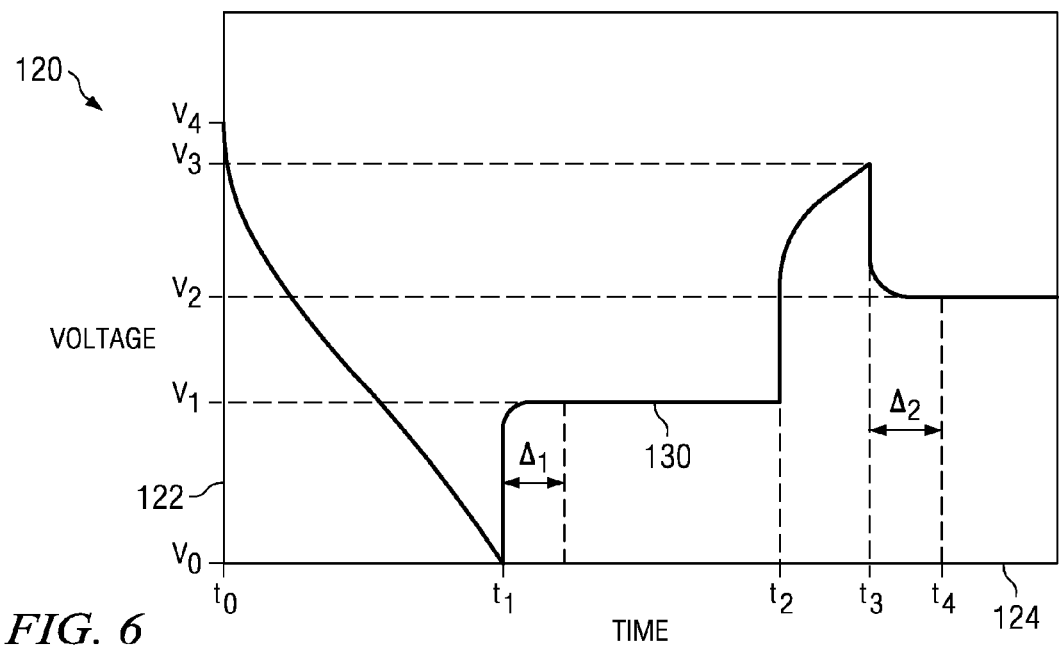
FIG. 6 is a graphic representation of battery terminal voltage as a function of time during a first battery operation for charging a battery.

FIG. 6 is a graphic representation of battery terminal voltage as a function of time during a first battery operation for charging a battery. In FIG. 6, a graphic representation 120 indicates data with respect to terminal voltage (in Volts) on a first axis 122 and with respect to time on a second axis 124. Represented data is arrayed in a curve 130. A battery operation that discharges the battery takes place between time $t_0$ and time $t_1$ to discharge the battery from a voltage level $V_4$ to a voltage level $V_0$. After the battery operation is terminated at time $t_1$ terminal voltage recovers from voltage level $V_0$ to a voltage level $V_1$. A charge operation is commenced at time $t_2$ that raises terminal voltage to a voltage level $V_3$ and charging is terminated at a time $t_3$. Sometime after $t_3$ voltage settles at a lower voltage level $V_2$. The battery is in a relaxed state at some time following time $t_1$ and before time $t_2$. The battery is also in a relaxed state at some time following time $t_3$ and before a subsequent operation is commenced (not shown in FIG. 6). Settling time $\Delta_1$ to achieve a relaxed state after completion of a discharge operation and settling time $\Delta_2$ to achieve a relaxed state after completion of a charge operation may be significant, sometimes on the order of 500 seconds. Settling times $\Delta_1$, $\Delta_2$ are not necessarily equal in duration.

Using stored or otherwise accessible data, one may measure or otherwise determine battery capacity based upon open circuit measurements while the battery is in a relaxed state to establish a first capacity determination. Such a capacity determination may be effected during the interval between time $t_1 + \Delta_1$ and time $t_2$ before commencement of a battery operation (such as battery charge). Using similar data, one may measure or otherwise determine battery capacity based upon open circuit measurements to effect a second capacity determination as after time $t_3 + \Delta_2$ following the battery operation. The first and second capacity determinations may be established in terms of a first depth of discharge (DOD) before the battery operation and a second DOD after the battery operation. For purposes of this description, a battery is in a relaxed state when the battery has settled out from any preceding battery operation such as a charging operation or a discharging operation.

One may integrate current through the battery during the interval between the first capacity determination and the second capacity determination to determine an amount of charge used during the interval, based upon the relationship between charge and current:

$$Q = \int_0^t i(t)dt \quad [3]$$

Where, Q is charge,
  i is current, and
  t is time of current flow.

The first and second DOD values and the battery current flow may be employed to determine the chemical capacity of the battery after the battery operation, such as a charge operation during the time interval $t_2$-$t_3$ illustrated in FIG. 6. Data of the sort described in connection with FIGS. 1-5 may be advantageously employed in determining the first and second DOD values.

Knowing the value of the maximum capacity $Q_{MAX}$ allows one to obtain a value for the depth of discharge (DOD) at any time during discharge. First one determines an initial value for DOD ($DOD_0$) before a charge or discharge operation. The initial value $DOD_0$ may have been stored from a previous determination during a previous charge or discharge operation. Another way to obtain an initial value $DOD_0$ is to determine an open circuit voltage ($OCV_0$) and employ a predetermined or predefined relationship:

$$DOD = f(OCV, T) \quad [4]$$

Where, OCV is open circuit voltage; and
T is temperature
to obtain an initial value $DOD_0$ for depth of discharge. When a charge operation or a discharge operation begins, current is integrated to provide an amount of charge passed ($Q_{PASS}$). Presently extant DOD may be determined at any moment during charge or discharge using the relationship:

$$DOD = DOD_0 + \frac{Q_{PASS}}{Q_{MAX}} \quad [5]$$

When DOD becomes below zero (or below another predetermined value) or if battery terminal voltage goes below minimum voltage $V_{MIN}$ established for the host device powered by the battery, then discharge of the battery should be terminated to avoid damaging the battery by over-discharging the battery. Minimum voltage $V_{MIN}$ is established by the host device's ability to operate at low voltages.

Alternatively, the maximum amount of charge that can be discharged from the presently extant state of a battery (i.e., remaining capacity; $Q_{REM}$) can be determined according to the relationship:

$$Q_{REM} = (1 - DOD_0) \cdot Q_{MAX} \quad [6]$$

When a discharge operation begins, the amount of charge passed $Q_{PASS}$ is compared with remaining charge $Q_{REM}$. Discharge may be terminated when $Q_{PASS} \geq Q_{REM}$, or when terminal voltage is below the minimum voltage $V_{MIN}$ established for the host device powered by the battery.

This method for controlling discharge of a battery permits terminating battery discharge upon reaching minimum operating voltage requirement of a powered device (i.e., a host device using the battery power) or at the manufacturer-recommended termination voltage, whichever is reached first. In this manner, damage to a battery because of over-discharge is avoided, but usable battery capacity is not sacrificed. A beneficial result is that battery run-time is increased, especially in older batteries.

Figure 7:
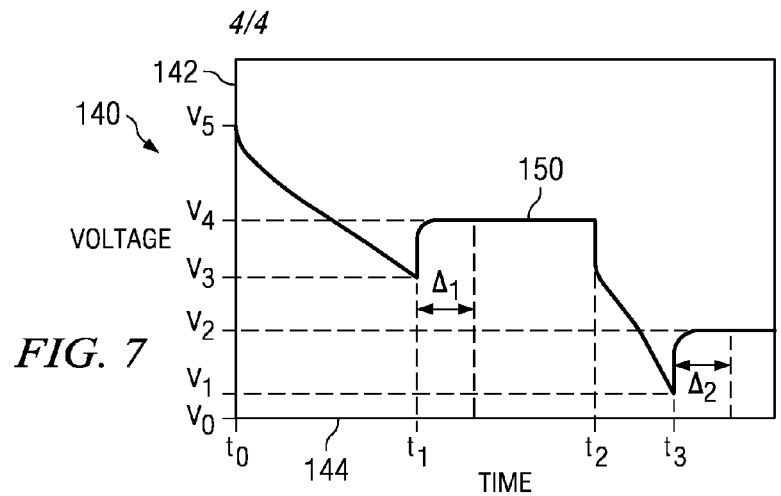
FIG. 7 is a graphic representation of battery terminal voltage as a function of time during a second battery operation for discharging a battery.

FIG. 7 is a graphic representation of battery terminal voltage as a function of time during a second battery operation for discharging a battery. In FIG. 7, a graphic representation 140 indicates data with respect to terminal voltage (in Volts) on a first axis 142 and with respect to time on a second axis 144. Represented data is arrayed in a curve 150. A first battery operation that discharges the battery takes place between time $t_0$ and time $t_1$ to discharge the battery from a voltage level $V_5$ to a voltage level $V_3$. After the first battery operation is terminated at time $t_1$, terminal voltage recovers from voltage level $V_3$ to a voltage level $V_4$. A second battery operation that discharges the battery is commenced at time $t_2$ that lowers terminal voltage to a voltage level $V_1$. After the second battery operation is terminated at time $t_3$ terminal voltage recovers from voltage level $V_1$ to a voltage level $V_2$. The battery is in a relaxed state at some time following time $t_1$ and before time $t_2$. The battery is also in a relaxed state at some time following time $t_3$ and before a subsequent operation is commenced (not shown in FIG. 7). Settling time $\Delta_1$ to achieve a relaxed state after completion of the first battery operation and settling time $\Delta_2$ to achieve a relaxed state after completion of the second battery operation may be significant, sometimes on the order of 500 seconds. Settling times $\Delta_1$, $\Delta_2$ are not necessarily equal in duration.

Using stored or otherwise accessible data, one may measure or otherwise determine battery capacity based upon open circuit measurements while the battery is in a relaxed state to establish a first capacity determination as during the interval between time $t_1 + \Delta_1$ and time $t_2$ before commencement of a battery operation (such as the second battery operation). Using similar data, one may measure or otherwise determine battery capacity based upon open circuit measurements establish a second capacity determination as after time $t_3 + \Delta_2$ following the second battery operation. The first and second capacity determinations may be established in terms of a first depth of discharge (DOD) before the battery operation and a second DOD after the battery operation. For purposes of this description, a battery is in a relaxed state when the battery has settled out from any preceding battery operation such as a charging operation or a discharging operation.

One may integrate current through the battery during the interval between the first capacity determination and the second capacity determination to determine an amount of charge used during the interval, based upon the relationship between charge and current described above in connection with expression [3].

The first and second DOD values and the battery current flow may be employed to determine the chemical capacity of the battery after the battery operation, such as a discharge operation during the time interval $t_2$-$t_3$ illustrated in FIG. 7. Data of the sort described in connection with FIGS. 1-5 may be advantageously employed in determining the first and second DOD values.

Knowing the value of the maximum capacity $Q_{MAX}$ allows one to obtain a value for the depth of discharge (DOD) at any time during discharge. First one determines an initial value for DOD ($DOD_0$) before a charge or discharge operation. The initial value $DOD_0$ may have been stored from a previous determination during a previous charge or discharge operation. Another way to obtain an initial value $DOD_0$ is to determine an open circuit voltage ($OCV_0$) and employ a predetermined or predefined relationship set forth above in Expression [4] to obtain an initial value $DOD_0$ for depth of discharge. When a charge operation or a discharge operation begins, current is integrated to provide an amount of charge passed ($Q_{PASS}$). Presently extant DOD may be determined at any moment during charge or discharge using the relationship set forth above in Expression [5].

When DOD becomes below zero (or below another predetermined value) or if battery terminal voltage goes below minimum voltage $V_{MIN}$ established for the host device powered by the battery, then discharge of the battery should be terminated to avoid damaging the battery by over-discharging the battery. Minimum voltage $V_{MIN}$ is established by the host device's ability to operate at low voltages.

Alternatively, the maximum amount of charge that can be discharged from the presently extant state of a battery (i.e., remaining capacity; $Q_{REM}$) can be determined according to the relationship set forth above in Expression [6].

When a discharge operation begins, the amount of charge passed $Q_{PASS}$ is compared with remaining charge $Q_{REM}$. Discharge may be terminated when $Q_{PASS} \geq Q_{REM}$, or when terminal voltage is below the minimum voltage $V_{MIN}$ established for the host device powered by the battery.

This method for controlling discharge of a battery permits terminating battery discharge upon reaching minimum operating voltage requirement of a powered device (i.e., a host device using the battery power) or at the manufacturer-recommended termination voltage, whichever is reached first. In this manner, damage to a battery because of over-discharge is avoided, but usable battery capacity is not sacrificed. A beneficial result is that battery run-time is increased, especially in older batteries.

Figure 8:
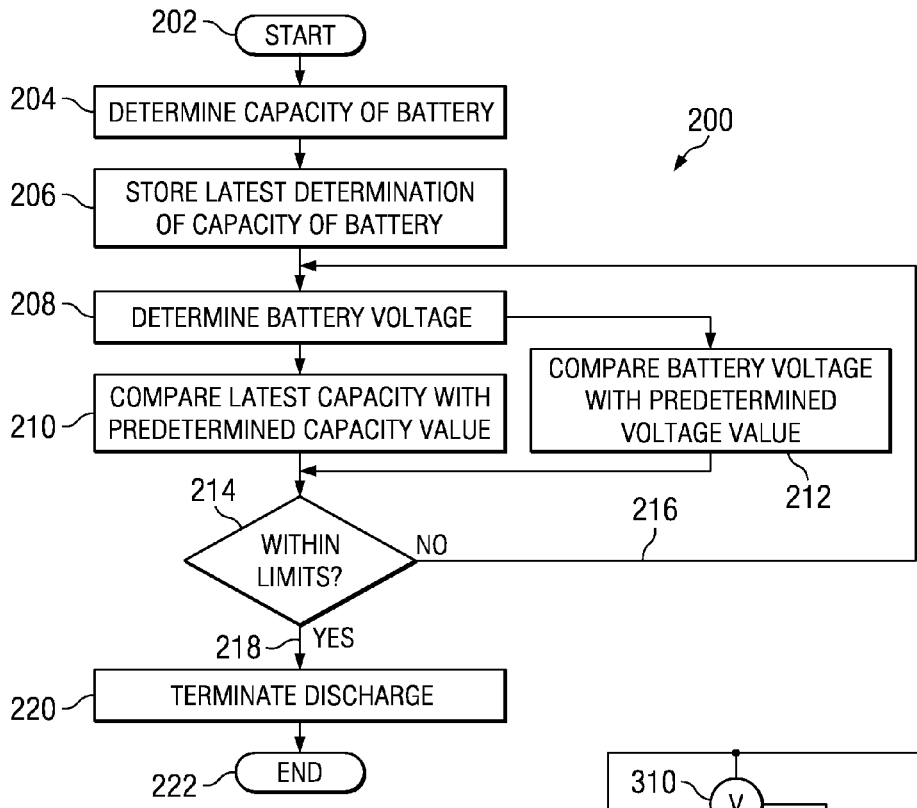
FIG. 8 is a flow chart illustrating the method of the present invention.

FIG. 8 is a flow chart illustrating the method of the present invention. In FIG. 8, a method 200 for effecting termination of discharge of a battery to avoid damaging the battery and substantially maximize use of capacity of the battery begins at a START locus 202. Method 200 continues by periodically effecting a determination of capacity of the battery, as indicated by a block 204. The periodic determinations are effected at different ages of the battery.

Method 200 continues by storing a value representing at least a latest capacity result of the periodic determination of the capacity, as indicated by a block 206. Method 200 further continues by determining a battery voltage drawn from the battery, as indicated by a block 208. Method 200 continues with the steps of, in no particular order: (1) comparing the latest capacity result with a predetermined value of battery capacity, as indicated by a block 210; and (2) comparing the battery voltage with a predetermined value of battery voltage, as indicated by a block 212.

Method 200 next poses a query whether the latest capacity result is within a first predetermined range of the predetermined value of battery capacity or if the battery voltage is within a second predetermined range of the predetermined value of battery voltage, as indicated by a query block 214. If the latest capacity result is neither within a first predetermined range of the predetermined value of battery capacity nor the battery voltage is within a second predetermined range of the predetermined value of battery voltage, method 200 proceeds via NO response line to again determine battery voltage, as indicated by block 208. Method 200 then proceeds to again perform steps represented by blocks 208, 210, 214. If the latest capacity result is either within the first predetermined range of the predetermined value of battery capacity or if the battery voltage is within the second predetermined range of the predetermined value of battery voltage, method 200 proceeds via YES response line 218 and method 200 thereafter terminates discharge of the battery, as indicated by a block 220. Method 200 terminates at an END locus 222.

Figure 9:
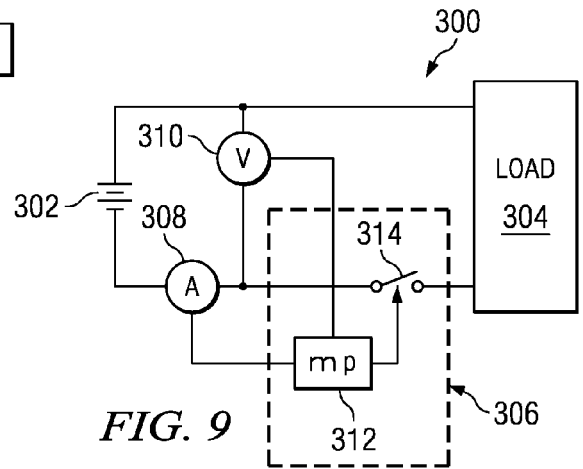
FIG. 9 is a schematic drawing illustrating the apparatus of the present invention.

FIG. 9 is a schematic drawing illustrating the apparatus of the present invention. In FIG. 9, an apparatus 300 controls operation of a battery 302 to provide power to a load 304. A processing and control unit 306 controls terminating discharge of battery 302 to avoid damage to battery 302 and substantially maximize use of chemical capacity of battery 302. Processing and control unit 306 is coupled with battery 302. Processing and control unit 306 determines a first depth of discharge of battery 302 while battery 302 is in a relaxed state before commencement of a first battery operation. Processing and control unit 306 determines a second depth of discharge of battery 302 while battery 302 is in a relaxed state after completion of the first battery operation.

A first measuring unit 308 is coupled with battery 302 and with the processing and control unit 306. First measuring unit 308 determines current flow from battery 302 during the first battery operation. A second measuring unit 310 is coupled with battery 302 and with processing and control unit 306. Second measuring unit 310 determines a battery voltage or terminal voltage across battery 302. Processing and control unit 306 employs the first depth of discharge, the second depth of discharge and the current flow for determining maximum chemical capacity of battery 302 after completion of the first battery operation.

If the maximum chemical capacity of battery 302 is neither within a first predetermined range of a value of chemical capacity nor the terminal voltage of battery 302 is within a second predetermined range of a voltage value, then processing and control unit 306 cooperates with measuring units 308, 310 to determine maximum chemical capacity of battery 302 after completion of a next battery operation.

If the maximum chemical capacity of battery 302 is within the first predetermined range of the value of chemical capacity or if the terminal voltage of battery 302 is within the second predetermined range of voltage value, then processing and control unit 306 terminates discharge of the battery.

Processing and control unit 306 may include a processing unit 312 coupled to control a switch unit 314. Switch unit responds to signals provided by processing unit 312 to open or close a connection between battery 302 and load 304.

Processing and control unit 306 may effect determining at least one of the first depth of discharge and the second depth of discharge of battery 302 by consulting preestablished data relating depth of discharge with at least one measurable parameter associated with operation of battery 302. The data consulted may be stored, by way of example and not by way of limitation, within a memory storage element (not shown in FIG. 9) coupled with or otherwise associated with processing unit 312. By way of further example and not by way of limitation, measurable parameters associated with operation of battery 302 may include terminal or battery voltage and age of battery 302. By way of still further example and not by way of limitation, the preestablished data may relate depth of discharge for battery 302 with battery voltage of for battery 302 for a variety of ages of battery 302. By way of yet another example and not by way of limitation, the preestablished data may be embodied in a family of data representations relating depth of discharge for battery 302 with the battery voltage for a variety of ages of battery 302.

Of importance is the capability of the method and apparatus of the present invention to monitor extant capacity of a battery and compare that extant capacity with the maximum capacity parameter $Q_{MAX}$ and the minimum operating voltage $V_{MIN}$ of the host device in real time. The method and apparatus of the present invention can be employed without considering the effect that age of the battery has upon internal resistance of the battery and the effect of changes in internal resistance upon discharge rate of the battery. The method and apparatus of the present invention are employed as a safety measure to ensure that discharge of a battery is not continued once one of the predetermined conditions are met: (1) maximum capacity $Q_{MAX}$ is reached or (2) minimum voltage $V_{MIN}$ is reached. No functionality is present to effect a gas gauge function, such as to indicate remaining capacity or to indicate remaining run-time. Because no such predictive function is present in the present invention, no actual knowledge of an actual value for presently extant capacity is determined. The occasion of reaching maximum capacity $Q_{MAX}$ or reaching minimum voltage $V_{MIN}$ is observed and is utilized to determine when a discharging of a battery is to be terminated.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for operating a battery to terminate discharge of said battery to avoid damage to said battery and substantially maximize use of chemical capacity of said battery; the method comprising the steps of:
    (a) determining a first depth of discharge of said battery while said battery is in a relaxed state before commencement of a first battery operation;
    (b) determining current flow from said battery during said first battery operation;
    (c) determining a second depth of discharge of said battery while said battery is in a relaxed state after completion of said first battery operation;
    (d) determining a battery voltage across said battery;
    (e) employing said first depth of discharge, said second depth of discharge and said current flow for determining a maximum chemical capacity of said battery after completion of said first battery operation;
    (f) during a next battery operation following said first battery operation, integrating current flow from said battery with respect to time over a time interval to determine an integrated charge value at an end-of-interval-time substantially when said interval ends;
    (g) employing said maximum chemical capacity, said integrated charge value and said first depth of discharge to determine an extant depth of discharge at said end-of-interval-time;
    (h) if said extant depth of discharge is neither within a first predetermined range of a predefined maximum depth of discharge nor said battery voltage is within a second predetermined range of a predefined minimum voltage, carrying out steps (f) through (g);
    (i) if said extant depth of discharge is within a first predetermined range of a predefined maximum depth of discharge or if said battery voltage is within a second predetermined range of a predefined minimum voltage, terminating said next battery operation.

2. A method for operating a battery to terminate discharge of said battery to avoid damage to said battery and substantially maximize use of chemical capacity of said battery as recited in claim 1 wherein said determining at least one of said first depth of discharge and said second depth of discharge is effected by consulting preestablished data relating depth of discharge with at least one measurable parameter associated with operation of said battery.

3. A method for operating a battery to terminate discharge of said battery to avoid damage to said battery and substantially maximize use of chemical capacity of said battery as recited in claim 2 wherein said at least one measurable parameter are said battery voltage and age of said battery.

4. A method for operating a battery to terminate discharge of said battery to avoid damage to said battery and substantially maximize use of chemical capacity of said battery as recited in claim 3 wherein said preestablished data relates depth of discharge for said battery with said battery voltage for a variety of ages of said battery.

5. A method for operating a battery to terminate discharge of said battery to avoid damage to said battery and substantially maximize use of chemical capacity of said battery as recited in claim 4 wherein said preestablished data is embodied in a family of graphic representations relating depth of discharge for said battery with said battery voltage for a variety of ages of said battery.

6. A method for operating a battery to terminate discharge of said battery to avoid damage to said battery and substantially maximize use of chemical capacity of said battery as recited in claim 4 wherein said preestablished data is embodied in a family of data representations relating depth of discharge for said battery with said battery voltage for a variety of ages of said battery.

7. A method for effecting termination of discharge of a battery to avoid damaging said battery and substantially maximize use of capacity of said battery; the method comprising the steps of:
    (a) periodically effecting a determination of capacity of said battery; said periodic determinations being effected at different ages of said battery;
    (b) storing a value representing at least a latest capacity result of said periodic determination of said capacity;
    (c) determining a battery voltage drawn from said battery;
    (d) during a monitored battery operation, integrating current flow from said battery with respect to time over a time interval to determine an integrated charge value at an end-of-interval-time substantially when said interval ends;
    (e) determining an extant depth of discharge at said end-of-interval-time;
    (f) in no particular order:
        (1) comparing said extant depth of discharge with a predetermined value of maximum depth of discharge; and
        (2) comparing said battery voltage with a predetermined value of battery voltage;
    (g) if said extant depth of discharge is neither within a first predetermined range of said predetermined value of maximum depth of discharge nor said battery voltage is within a second predetermined range of said predetermined value of battery voltage, carrying out steps (d) through (f);
    (h) if said extant depth of discharge is within a first predetermined range of said predetermined value of maximum depth of discharge or if said battery voltage is within a second predetermined range of said predetermined value of battery voltage, terminating said monitored battery operation.

8. A method for effecting termination of discharge of a battery to avoid damaging said battery and substantially maximize use of capacity of said battery as recited in claim 7 wherein step (a), said periodically effecting a determination of capacity of said battery, is carried out by a periodic measuring of said capacity while substantially fully discharging said battery.

9. A method for effecting termination of discharge of a battery to avoid damaging said battery and substantially maximize use of capacity of said battery as recited in claim 7 wherein step (a), said periodically effecting a determination of capacity of said battery, is carried out by the steps of:
    (a)(1) determining a first depth of discharge of said battery while said battery is in a relaxed state before commencement of a determining battery operation;
    (a)(2) determining current flow from said battery during said determining battery operation;

(a)(3) determining a second depth of discharge of said battery while said battery is in a relaxed state after completion of said determining battery operation; and (a)(4) employing said first depth of discharge, said second depth of discharge and said current flow for determining a latest capacity result of said capacity of said battery after completion of said determining battery operation.

10. A method for effecting termination of discharge of a battery to avoid damaging said battery and substantially maximize use of capacity of said battery as recited in claim 9 wherein step (g) is modified to: if said extant depth of discharge is neither within a first predetermined range of said predetermined value of maximum depth of discharge nor said battery voltage is within a second predetermined range of said predetermined value of battery voltage, carrying out steps (d) through (f) for a next monitored battery operation.

11. A method for effecting termination of discharge of a battery to avoid damaging said battery and substantially maximize use of capacity of said battery as recited in claim 10 wherein said determining at least one of said first depth of discharge and said second depth of discharge is effected by consulting preestablished data relating depth of discharge with at least one measurable parameter associated with operation of said battery.

12. A method for effecting termination of discharge of a battery to avoid damaging said battery and substantially maximize use of capacity of said battery as recited in claim 11 wherein said at least one measurable parameter are said battery voltage and age of said battery.

13. A method for effecting termination of discharge of a battery to avoid damaging said battery and substantially maximize use of capacity of said battery as recited in claim 12 wherein said preestablished data relates depth of discharge for said battery with said battery voltage for a variety of ages of said battery.

14. A method for effecting termination of discharge of a battery to avoid damaging said battery and substantially maximize use of capacity of said battery as recited in claim 13 wherein said preestablished data is embodied in a family of graphic representations relating depth of discharge for said battery with said battery voltage for a variety of ages of said battery.

15. A method for effecting termination of discharge of a battery to avoid damaging said battery and substantially maximize use of capacity of said battery as recited in claim 13 wherein said preestablished data is embodied in a family of data representations relating depth of discharge for said battery with said battery voltage for a variety of ages of said battery.

16. An apparatus for controlling operation of a battery to terminate discharge of said battery to avoid damage to said battery and substantially maximize use of chemical capacity of said battery; the apparatus comprising:

(a) a processing and control unit coupled with said battery; said processing and control unit determining a first depth of discharge of said battery while said battery is in a relaxed state before commencement of a first battery operation; said processing and control unit determining a second depth of discharge of said battery while said battery is in a relaxed state after completion of said first battery operation;

(b) a first measuring unit coupled with said battery and with said processing and control unit; said first measuring unit determining current flow from said battery during said first battery operation;

(c) a second measuring unit coupled with said battery and with said processing and control unit; said second measuring unit determining a battery voltage across said battery;

said processing and control unit employing said first depth of discharge, said second depth of discharge and said current flow for determining maximum chemical capacity of said battery after completion of said first battery operation; during a next battery operation following said first battery operation, said processing and control unit integrating current flow from said battery with respect to time over a time interval to determine an integrated charge value at an end-of-interval-time substantially when said interval ends;

said processing and control unit employing said maximum chemical capacity, said integrated charge value and said first depth of discharge to determine an extant depth of discharge at said end-of-interval-time; if said extant depth of discharge is neither within a first predetermined range of a predefined maximum depth of discharge nor said battery voltage is within a second predetermined range of a predefined minimum voltage, said processing and control unit cooperates with said first and second measuring units to determine a subsequent depth of discharge at a subsequent time; if said extant depth of discharge is within a first predetermined range of a predefined maximum depth of discharge or if said battery voltage is within a second predetermined range of a predefined minimum voltage, terminating said next battery operation.

17. An apparatus for controlling operation of a battery to terminate discharge of said battery to avoid damage to said battery and substantially maximize use of chemical capacity of said battery as recited in claim 16 wherein said processing and control unit effects said determining at least one of said first depth of discharge and said second depth of discharge by consulting preestablished data relating depth of discharge with at least one measurable parameter associated with operation of said battery.

18. An apparatus for controlling operation of a battery to terminate discharge of said battery to avoid damage to said battery and substantially maximize use of chemical capacity of said battery as recited in claim 17 wherein said at least one measurable parameter are said battery voltage and age of said battery.

19. An apparatus for controlling operation of a battery to terminate discharge of said battery to avoid damage to said battery and substantially maximize use of chemical capacity of said battery as recited in claim 18 wherein said preestablished data relates depth of discharge for said battery with said battery voltage for a variety of ages of said battery.

20. An apparatus for controlling operation of a battery to terminate discharge of said battery to avoid damage to said battery and substantially maximize use of chemical capacity of said battery as recited in claim 19 wherein said preestablished data is embodied in a family of data representations relating depth of discharge for said battery with said battery voltage for a variety of ages of said battery.

* * * * *